US010838191B2

(12) United States Patent
Candell et al.

(10) Patent No.: US 10,838,191 B2
(45) Date of Patent: Nov. 17, 2020

(54) METHOD OF OPERATING A MICROSCOPE

(71) Applicant: Carl Zeiss Microscopy GmbH, Jena (DE)

(72) Inventors: Susan Candell, Lafayette, CA (US); Thomas Anthony Case, Walnut Creek, CA (US); Lorenz Lechner, Dublin, CA (US)

(73) Assignee: Carl Zeiss Microscopy GmbH, Jena (DE)

( * ) Notice: Subject to any disclaimer, the term of this patent is extended or adjusted under 35 U.S.C. 154(b) by 206 days.

(21) Appl. No.: 15/843,441

(22) Filed: Dec. 15, 2017

(65) Prior Publication Data

US 2018/0172973 A1 Jun. 21, 2018

Related U.S. Application Data

(60) Provisional application No. 62/437,139, filed on Dec. 21, 2016.

(51) Int. Cl.
  *G02B 21/36* (2006.01)
  *G06T 7/33* (2017.01)
  *G06T 7/73* (2017.01)
(52) U.S. Cl.
  CPC ......... *G02B 21/365* (2013.01); *G02B 21/367* (2013.01); *G06T 7/33* (2017.01);
  (Continued)

(58) Field of Classification Search
  CPC .. G02B 21/365; G02B 21/006; G02B 21/367; G06T 7/73; G06T 7/33; G06T 7/337;
  (Continued)

(56) References Cited

U.S. PATENT DOCUMENTS 4,379,308 A * 4/1983 Kosmowski ......... G01B 11/024
  348/126
4,475,122 A * 10/1984 Green ................... G03F 9/7088
  348/87

(Continued)

OTHER PUBLICATIONS

German Office Action, with translation thereof, for corresponding DE application No. 10 2017 000 615.6 dated Aug. 29, 2017.

(Continued)

*Primary Examiner* — Francis Geroleo
*Assistant Examiner* — Christopher Kingsbury Glover
(74) *Attorney, Agent, or Firm* — Fish & Richardson P.C.

(57) ABSTRACT

A method of operating a microscope comprises recording a first image $I_1^h$ of a sample, wherein the first image contains a first feature $F_1$; recording a second image $I_2^h$ of the sample, wherein the second image contains a second feature $F_2$ arranged at a distance from the first feature; displacing the sample relative to the microscope by a displacement $\vec{d}$; recording a third image $I_3^h$ of the sample, wherein the third image contains the second feature; recording a fourth image $I_4^h$ of the sample, wherein the fourth image contains a third feature $F_3$ arranged at a distance from the second feature; and determining a position $\vec{r}_{13}^h$ of the third feature relative to the first feature based on the first, second, third and fourth images.

20 Claims, 4 Drawing Sheets (52) U.S. Cl.
CPC ...... *G06T 7/73* (2017.01); *G06T 2207/10061* (2013.01); *G06T 2207/10148* (2013.01); *G06T 2207/20016* (2013.01)

(58) Field of Classification Search
CPC ........ G06T 2207/10056; G06K 9/0014; G01B 9/02041; G01B 9/04
See application file for complete search history.

(56) References Cited

U.S. PATENT DOCUMENTS

| | | | |
|---|---|---|---|
| 4,766,311 A * | 8/1988 | Seiler .................... | G01B 15/00 250/252.1 |
| 2007/0065042 A1 | 3/2007 | Vroomen | |
| 2010/0092070 A1 | 4/2010 | Young et al. | |
| 2012/0300054 A1* | 11/2012 | Mito .................. | G01N 23/2251 348/79 |
| 2013/0146763 A1 | 6/2013 | Kawada et al. | |

OTHER PUBLICATIONS

A.L. Eberle et al., "Mission (im)possible—mapping the brain becomes a reality", Microscopy, vol. 64, No. 1, 2015 (Advance Access Publication Date: Dec. 26, 2014).

German Patent and Trademark Office, Office Action issued in corresponding Application No. 102017223435.0, dated Aug. 31, 2020, including English Translation, 8 pages.

Jim Buckman, "Use of automated image acquisition and stitching in scanning electron microscopy: Image of large scale areas of materials at high resolution", Microscopy and Analysis, pp. S13-S16, Jan. 2014.

\* cited by examiner

Fig. 1

PRIOR ART

METHOD OF OPERATING A MICROSCOPE

CROSS-REFERENCE TO RELATED APPLICATION

This application claims priority under 35 U.S.C. § 119(e)(1) to U.S. Provisional Application No. 62/437,139 filed Dec. 21, 2016. The content of this application is hereby incorporated by reference in its entirety.

FIELD

The disclosure relates to methods of operating microscopes. These methods may in particular include methods for performing precision measurements on objects using microscopes. The microscopes operated with the methods may in particular include scanning microscopes, such as particle beam microscopes, such as scanning electron microscopes and scanning ion microscopes, and light microscopes, such as scanning laser microscopes and confocal microscopes.

BACKGROUND

Scanning microscopes are capable of collecting data with high lateral resolutions. An object is positioned on a stage relative to the microscope, and a probe beam is scanned across a portion of the object. The probe beam incident on the object generates signals which are detected and associated with the current deflection position of the beam. The collected data can be displayed as an image or processed for desired purposes. It is common to acquire data from a rectangular region on the object by scanning the beam in a main scanning direction which is usually referred to as an x-direction or horizontal direction, and a sub-scan direction, which is then referred to as a y-direction or vertical direction. When the region has been scanned, measurement data corresponding to an array of locations x, y is collected. Within the field of view of the microscope, the beam can be directed to any desired position with very high accuracy. The accuracy of the positioning of the beam defines the imaging resolution of the recorded image. When the scanning is performed, the beam is directed to a position, remains there for a dwell time in order to collect sufficient signals forming the data associated with this position, and then the beam is moved forward by a step size to a next position, and signals are collected during the dwell time and associated with this next position, and so on. Alternatively, the beam can be scanned by continuously moving the beam across the object, and signals are collected and integrated over a predetermined time period while moving the beam. The signals integrated during this time period are associated with a pixel of the image; in this procedure, the predetermined time period defines a measure for the dwell time. If such scanning is performed on the full field of view of the microscope using relatively small center-to-center distances between adjacent pixels in order to generate an image having a very high resolution, signals will be collected from a huge number of locations requiring an impractical amount of time for recording an image. The time for recording an image is determined by the number of pixels multiplied by the dwell time. In practice, the amount of pixels of a recorded image of an object field is typically limited, for example, to 1024×1024 or 2048×2048. Therefore, if the number of pixels of a higher resolution image is the same as the number of pixels of the lower resolution image, the higher resolution image is obtained from a smaller object field within the field of view of the microscope, and lower resolution image is obtained from a larger object field within the field of view of the microscope. Higher and lower resolution images may, however, also differ with respect to the number of pixels contained in the images. Assuming that each pixel in the image corresponds to a location on the object from which the image information contained in the pixel is collected, higher resolution images differ from lower resolution image in that the locations on the object which correspond to adjacent pixels in the higher resolution image have smaller distances from each other than the locations on the object which correspond to adjacent pixels in the lower resolution image. Or, in other words, the center-to-center distances between adjacent pixels as measured on the object used for an image having a given resolution is smaller than the center-to-center distances between adjacent pixels as measured on the object used for an image having a resolution lower than the given resolution.

Properties of features contained within a same scanned object field, such as relative positions of these features, can be determined with an accuracy corresponding to the given scanning resolution used for recording an image by identifying the features within the image and determining positions of the features within the image.

If two features of the object have a distance from each other greater than the field of view of the microscope, there occurs the problem that it is not possible to record one image containing both features. If it is desired to measure the distance between these two features, the stage is conventionally moved relative to the microscope such that the first feature is within the field of view, a first image containing the first feature is recorded, the stage is then translated relative to the microscope until the second feature is within the field of view of the microscope, and a second image containing the second feature is recorded. The relative position of the two features can be determined based on the positions of the first and second features within the first and second images, respectively, and the amount of displacement of the stage between the image recordings. It is apparent that the accuracy of the position measurement is limited by the accuracy of the measurement of the displacement of the stage. Equipment for measuring stage positions with high accuracy, such as an interferometer, is expensive and still limited in its accuracy.

Another conventional method of measuring features within a region of interest greater than the field of view of the microscope is referred to as stitching in the art. In such methods, a plurality of overlapping images is recorded until the region of interest is sufficiently covered. Relative positions between adjacent images can then be determined with a relatively high accuracy by correlating image features contained in the overlap between adjacent images. It is possible to "stitch" together a large image containing the region of interest from the individual overlapping images and to determine the position of the two features within the region of interest by analyzing the combined or stitched image. The accuracy for determining the relative position is limited by the imaging resolution used for recording the individual images. In practice, a reasonable limited number of individual images must be used for covering the region of interest in a viable time, such that the object fields scanned for each individual image are considerably larger than the small fields used for high resolution imaging. Therefore, the measurement precision achieved in stitching measurements is limited by the imaging resolution used for the individual images or, in other words, the available time. It is to be noted that doubling the imaging resolution requires four times the amount of time. Moreover, if the time for recording individual images increases, drifts occurring in the system introduce additional position errors. When the field of view of the individual images is reduced in order to reduce the time for recording individual images, the stitching overhead is increased. Since the stitching technique requires identifiable features in the overlapping region between adjacent images, the size of the field of view of the individual images has a lower limit if identifiable features are only sparsely available on the object.

SUMMARY

The present disclosure takes the above considerations into account. It is an object of the disclosure to provide a method of operating a microscope which allows to determine properties of features of a sample having a distance from each other greater than a field of view of the microscope with a relatively high accuracy.

According to embodiments of the disclosure, plural images of portions of the sample are recorded at high and low imaging resolutions, and relative positions between features of the sample are determined based on these images.

According to some embodiments, a method of operating a microscope comprises: displacing a sample relative to the microscope by a first displacement; recording a first image of a first portion of the sample at a first high imaging resolution, using the microscope, prior to the performing of the first displacement, wherein the first image contains a first image feature corresponding to a first sample feature contained in the first portion of the sample; recording a second image of a second portion of the sample at a second high imaging resolution, using the microscope, prior to the performing of the first displacement, wherein the second image contains a second image feature corresponding to a second sample feature contained in the second portion of the sample, and wherein the second sample feature is arranged at a distance from the first sample feature; recording a third image of a third portion of the sample at a third high imaging resolution, using the microscope, subsequent to the performing of the first displacement, wherein the third image contains the second image feature corresponding to the second sample feature; recording a fourth image of a fourth portion of the sample at a fourth high imaging resolution, using the microscope, subsequent to the performing of the first displacement, wherein the fourth image contains a third image feature corresponding to a third sample feature contained in the fourth portion of the sample, and wherein the third sample feature is arranged at a distance from the second sample feature; determining a position of the third sample feature relative to the first sample feature based on the first, second, third and fourth images.

According to particular embodiments herein, the first, second, third and fourth portions of the sample from which the first, second, third and fourth images, respectively, are recorded, are substantially smaller than a field of view of the microscope such that the images having the high imaging resolution can be recorded in a relatively short time.

According to particular embodiments, the sample is not displaced relative to the microscope between the recording of the first image and the recording of the second image, and between the recording of the third image and the fourth image. The first and second sample features are located within the field of view of the microscope when the first and second images are recorded, and the second and third sample features are contained within the field of view of the microscope when the third and fourth images are recorded, accordingly. It is then possible to determine the position of the second sample feature relative to the first sample feature with an accuracy corresponding to the high imaging resolution based on the first and second images, it is possible to determine the position of the third sample feature relative to the second sample feature based on the third and fourth images with a similar accuracy, and it is further possible to determine the position of the third sample feature relative to the first sample feature based on the first, second, third and fourth images also with an accuracy corresponding to the high imaging resolution.

According to particular embodiments, a distance between the first sample feature and the third sample feature is greater than a field of view of the microscope such that it is not possible to have the first and third sample features simultaneously contained in the field of view of the microscope. Therefore, it is not possible to determine the position of the third sample feature relative to the first sample feature without performing the first displacement of the sample relative to the microscope.

The field of view of the microscope is the largest portion of the sample which can be imaged using the microscope while maintaining image distortions below a predefined threshold.

According to some embodiments, the determining of the first displacement is based on an estimated position of the third sample feature relative to the first or second sample features. The estimated position can be determined based on information provided by some other source or information obtained in preceding steps of the method. According to further embodiments, the determining of the first displacement is based on an estimated position of a target sample feature relative to the first sample feature or the second sample feature. The target sample feature can be a sample feature different from the first, second and third sample features which is, for example, to be imaged in a subsequent step of the method.

According to some embodiments, the method further comprises: recording a fifth image of a fifth portion of the sample at a first low imaging resolution, using the microscope, prior to the performing of the first displacement, wherein the first low imaging resolution is lower than each of the first, second, third and fourth high imaging resolutions, wherein the first and second portions of the sample at least partially overlap with the fifth portion of the sample, and wherein the first and second image features are both contained in the fifth image.

The fifth portion of the sample imaged by recording the fifth image is significantly larger than the first to fourth portions of the sample imaged using the high imaging resolutions. The fifth image may have a same number of pixels as the first to fourth images. However, the number of pixels of the fifth image may also be different from the number of pixels used for the first to fourth images. Still, the number of pixels of the fifth image is sufficiently low, such that the image can be recorded in a relatively short time, resulting in the imaging resolution of the fifth image being low compared to the high imaging resolutions of the first to fourth images.

According to some embodiments herein, the low resolution fifth image is recorded in order to determine the second sample feature and/or an estimated position of the second sample feature to be used for the method illustrated above. When an estimated position of the second sample feature is not known or if any knowledge on the second sample feature does not yet exist, the second sample feature can be selected from sample feature candidates corresponding to image feature candidates in the fifth image. For example, the sample feature candidate located closest to an estimated position of the third sample feature or an estimated position of a target sample feature can be selected as the second sample feature.

According to some embodiments, the method further comprises: recording a sixth image of a sixth portion of the sample at a second low imaging resolution, using the microscope, subsequent to the first displacing, wherein the second low imaging resolution is lower than each of the first, second, third and fourth high imaging resolutions, wherein the second and third portions of the sample at least partially overlap with the sixth portion of the sample, and wherein the second and third image features are both contained in the sixth image.

The sixth image may be recorded in order to determine the third image feature if an estimated position of the third sample feature corresponding to the third image feature is not yet known. The third image feature can be selected from image feature candidates contained within the sixth image, for example. Again, the selecting can be based on an estimated position of a target sample feature not contained in the fifth image.

According to some embodiments, the method allows to determine the position of the third sample feature relative to the first sample feature with a high accuracy, wherein the first and third sample features are not contained within a single field of view of the microscope, and wherein it is not necessary to record overlapping high-resolution images along a contiguous path extending between the first sample feature and the third sample feature. In other words, there exist regions of the sample along a straight line extending from the first sample feature to the third sample feature which have not been recorded as an image having a high imaging resolution.

The methods illustrated above rely on the presence of features which are visible, detectable and discriminable in the recorded image along a contiguous path between an initial feature and a target feature. In some situations, however, such features are not present on a sample. In other situations, even too many features can be present on a sample in a regular arrangement such that the features are not discriminable. It is then possible to generate suitable features to perform the methods illustrated above. The features can be generated subsequent to the recording of the first image and based on an analysis of the first image, and the features can be generated using a suitable tool, such as a needle for scratching the surface of the sample, or a charged particle beam directed to the surface of the object in order to remove material from the surface or to deposit material on the surface.

BRIEF DESCRIPTION OF THE DRAWINGS

The forgoing as well as other advantageous features of the disclosure will be more apparent from the following detailed description of exemplary embodiments with reference to the accompanying drawings. It is noted that not all possible embodiments necessarily exhibit each and every, or any, of the advantages identified herein.

DETAILED DESCRIPTION OF EXEMPLARY EMBODIMENTS

In the exemplary embodiments described below, components that are alike in function and structure are designated as far as possible by alike reference numerals. Therefore, to understand the features of the individual components of a specific embodiment, the descriptions of other embodiments and of the summary of the disclosure should be referred to.

Figure 1:
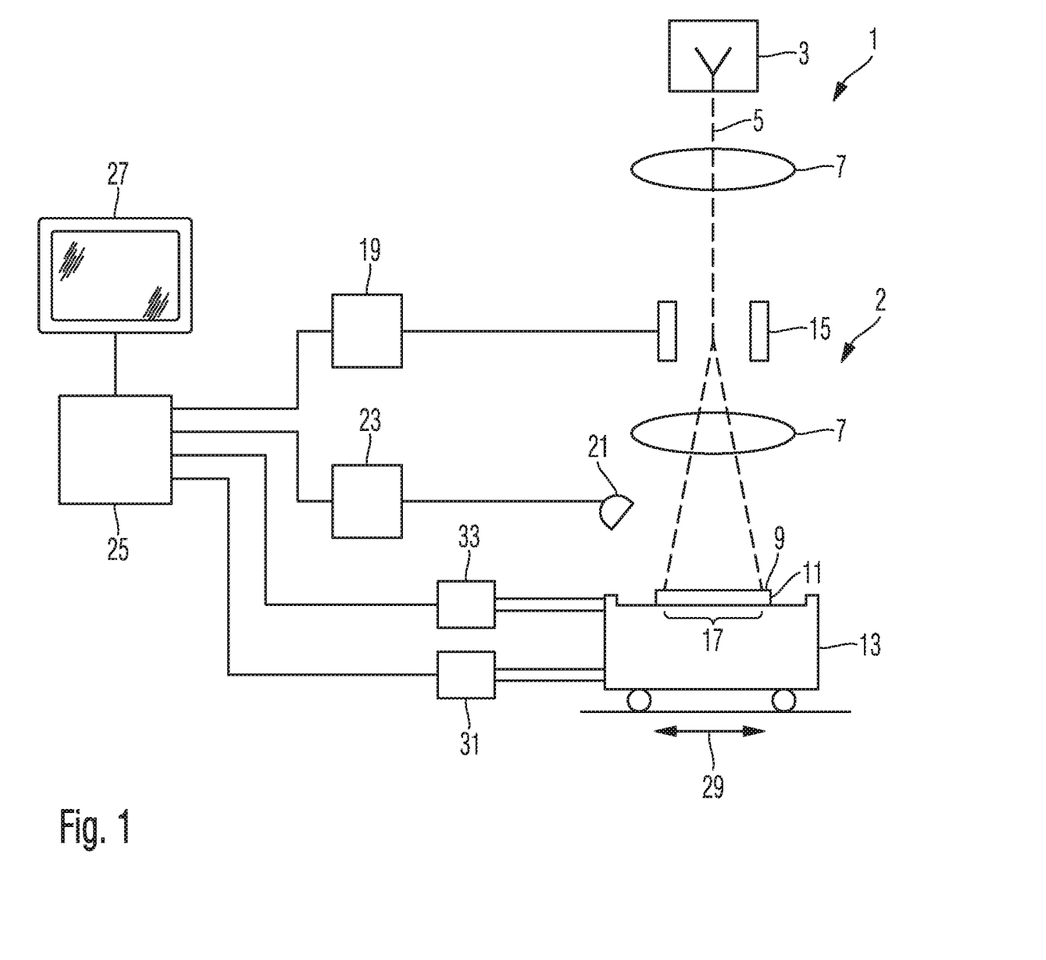
FIG. 1 is a schematic illustration of a scanning type microscope which can be used for carrying out embodiments of the method of operating a microscope.

FIG. 1 is a schematic illustration of a scanning type microscope system which can be used for carrying out the methods illustrated with reference to FIGS. 2 to 4 below. The scanning type microscope system 1 includes a microscope 2 comprising a beam generator 3 for generating a beam 5 and one or more lenses 7 for focusing the beam 5 on a surface 9 of a sample 11 mounted on a stage 13 such that the surface 9 of the sample is positioned relative to the beam generator 3 and lenses 7 such that the beam 5 can be focused on the surface 9 of the sample 11. The sample can be a semiconductor wafer, for example. The microscope 2 further comprises a beam deflector 15 configured to deflect the beam 5 such that it can be directed to a desired position within a field of view 17 on the surface 9 of the sample 11. The beam deflector 15 is controlled by a deflection controller 19. The microscope 2 further comprises a detector 21 positioned and configured such that signals generated by the beam 5 incident on the sample 11 can be detected. The signals generated by the detector are analyzed by a detector controller 23 which generates detection data from the signals generated by the detector 21 and supplies the detection data to a main controller 25. The main controller 25 controls the deflection controller 19 such that the beam 5 is scanned across a selected portion of the surface 9 of the sample 11. The main controller 25 associates the received detection data with the locations within the selected portion of the sample to which the beam 5 is directed. These associated data can be displayed as a microscope image on a display 27, for example.

The stage 13 can be displaced relative to the microscope 2 as indicated by an arrow 29 in FIG. 1. The displacement 29 is produced by an actuator 31 controlled by the main controller 25. The amount of displacement is measured by a measurement device 33 supplying the measured displacement to the main controller 25.

The principles of the scanning type microscope system 1 illustrated above with reference to FIG. 1 can be achieved with various types of scanning microscopes. For example, the microscope 2 can be a charged particle microscope in which the beam generator 3 is a charged particle beam source, the lenses 7 provide magnetic or electric fields for focusing the charged particle beam 5, the beam deflector 15 is a deflector generating adjustable magnetic or electric deflection fields, and the detector 21 can be a particle detector or a light detector detecting signals, such as secondary or backscattered electrons and catholuminescent light generated by the particles of the particle beam 5 incident on the sample 11. The particles generated by the beam source 3 can be ions or electrons. According to other examples, the scanning microscope 1 is a light microscope in which the beam source 3 can be a light source, such as a laser, the beam 5 can be a light beam, the lenses 7 can be refractive or reflective lenses, the deflector 15 can be a movable mirror, and the detector 21 can be a light detector. According to further examples, the scanning microscope can be configured to perform a spatially resolved spectroscopy method in which a spectrum is recorded for each pixel of the image so that, for example, a measured energy spectrum of detected radiation is associated with each pixel of the image.

Figure 2:
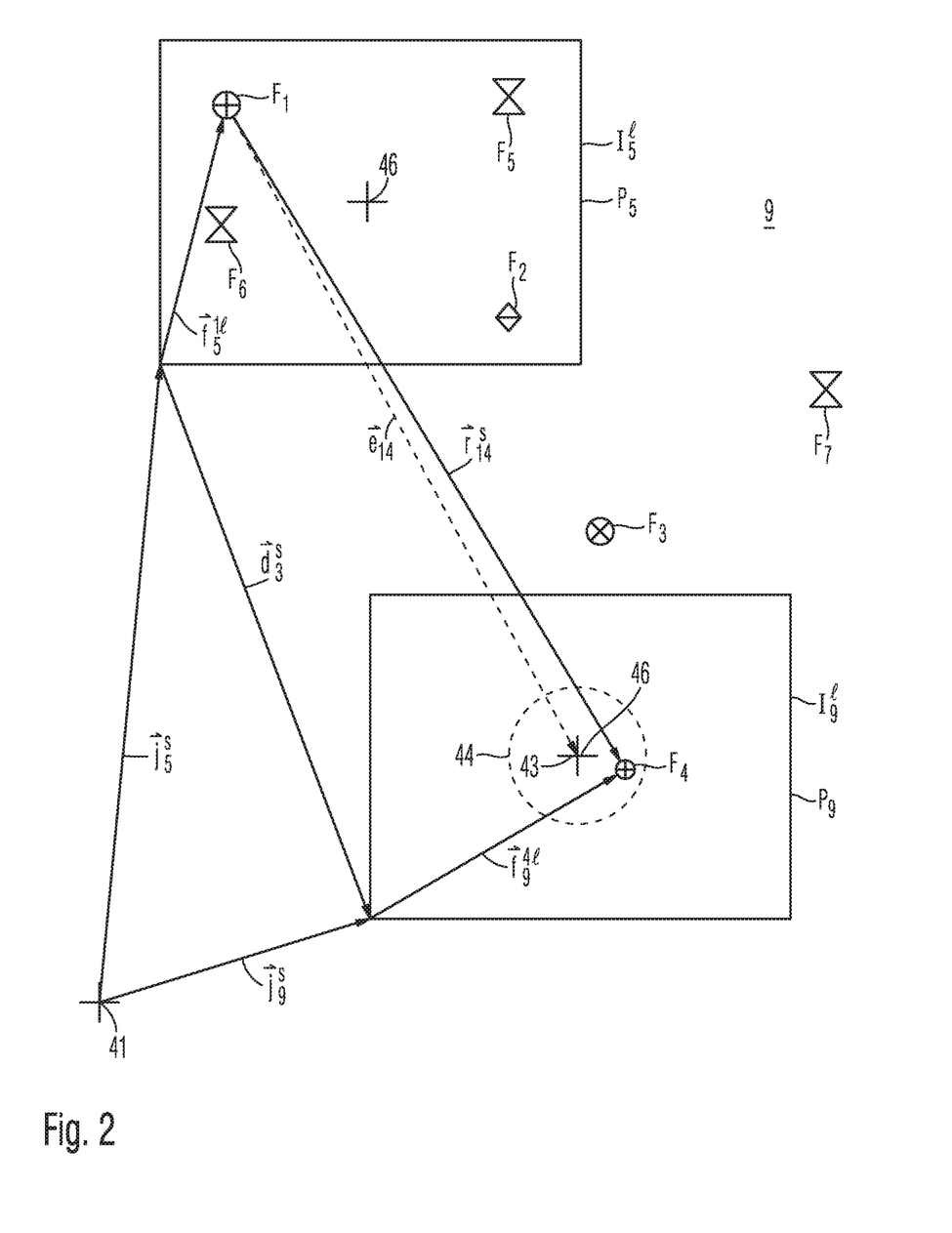
FIG. 2 illustrates a method of determining a relative position between two sample features with an accuracy limited by an accuracy of a displacement between the sample and the microscope.

FIG. 2 is a schematic diagram illustrating a method of operating the scanning type microscope shown in FIG. 1. FIG. 2 shows an elevational view of the surface 9 of the sample 11. The sample includes the features $F_1$ to $F_7$ which can be, for example, structures intentionally produced by a manufacturing method, unintentionally produced defects or irregularities on the sample surface or other structures which are visible, detectable or discernible in recorded images of the sample surfaces such that there is a one-to-one correspondence between sample features located on the sample and image features discernible from the data generated by the microscope. The image features can be identified within an image by image analysis analyzing, for example, intensity differences between adjacent image locations.

In the method illustrated with reference to FIG. 2, it is assumed that a distance $\vec{r}_{14}^{s}$ between features $F_1$ and $F_4$ is to be determined using the microscope system 1. $P_5$ indicates a portion of the surface 9 of the sample 11 which can be imaged using the microscope 1 and which corresponds to the field of view of the microscope. The lateral extent of the field of view of the microscope is limited by a maximum amount of image distortions acceptable in a given application. Smaller acceptable image distortions require a smaller field of view. $I_5^l$ in FIG. 2 indicates the image recorded by the microscope system 1 when the portion $P_5$ of the sample is scanned. Images are indicated by $I_n^c$ with a subscript number n corresponding to the subscript number of the portion $P_n$ which is imaged, and a superscript character c indicating an imaging resolution. Two exemplary imaging resolutions are used in the illustrated method, and the superscript character c is "l" for low imaging resolutions and "h" for high imaging resolutions. Since the image $I_5^l$ is the image of the surface portion $P_5$ corresponding to the field of view, the imaging resolution used for recording the image $I_5^l$ is low. For example, in a typical scanning electron microscope, the lateral extension of the field of view is in the order of 0.5 mm to 5.0 mm, and the low imaging resolution is in the order of 0.5 μm to 5.0 μm.

FIG. 2 shows that the distance between features $F_1$ and $F_4$ is greater than the lateral extent of the field of view such that it is not possible to position the sample relative to the microscope such that both features $F_1$ and $F_4$ are simultaneously contained within a single image. Therefore, it is not possible to measure the relative position between features $F_1$ and $F_4$ without displacing the stage 13 of the microscope.

For the purposes of illustrating the method, it is assumed that approximate positions of the features $F_1$ and $F_4$ on the sample are initially known from some other source of information, such as a macro-inspection method identifying defects on the wafer, and that it is now an object of the method to determine the relative position between the features $F_1$ and $F_2$ with a higher accuracy using the microscope system 1. Reference numeral 41 in FIG. 2 indicates an origin of a coordinate system of the sample 11, and, in a first step, the sample is positioned, using the stage 13, such that it can be expected that the feature $F_1$ of the sample is located within the field of view of the microscope 2, and the portion $P_5$ of the sample corresponding to the field of view of the microscope is adjusted accordingly. The position of an imaged sample region portion in the coordinate system of the sample can be referenced by a vector $\vec{j}_n^c$ pointing from the origin 41 to the lower left corner of the imaged sample portion $P_n$, wherein the subscript n corresponds to the subscript n used for referencing the surface portion of $P_n$. The superscript character c indicates an achievable accuracy and is "l" if the accuracy corresponds to the low imaging resolution, "h" if the accuracy corresponds to the high imaging resolution, and "s" if the accuracy is limited by the accuracy of the positioning of the stage.

After positioning the stage 13 relative to the microscope 2 such that it can be expected that the feature $F_1$ is within the field of view of the microscope, the sample portion $P_5$ is recorded as the image $I_5^l$. The image $I_5^l$ is analyzed in order to identify the feature $F_1$ within the image. The position of the feature $F_1$ within the image can be determined with an accuracy corresponding to the low imaging resolution of the image $I_5^l$. The position of the feature $F_1$ within the image can be referenced by a vector $\vec{f}_5^{1l}$ pointing from the lower left corner of the image to a selected reference position of the feature $F_1$. In the following, positions of a feature within an image are indicated by a vector $\vec{f}_n^{ic}$, wherein the subscript n corresponds to the subscript n of the image $I_n^c$, the number i in the superscript corresponds to the subscript of the feature $F_i$, and the character c in the superscript corresponds to the imaging resolution of the image.

A center 43 of a circle 44 in FIG. 2 indicates an estimated position of the feature $F_4$ calculated based on an estimated position $\vec{e}$ of the feature $F_4$ relative to the feature $F_1$ and the measured position $\vec{j}_5^s + \vec{f}_5^{1l}$ of the feature $F_1$. The radius of the circle 44 indicates the accuracy with which the relative position of features $F_1$ and $F_4$ is initially known. The stage is then positioned such that the circle 44 is contained within the field of view of the microscope. For example, the stage is positioned such that the center 43 of the circle 44 coincides with a center 46 of the field of view of the microscope. Thereafter, an image $I_9^l$ is recorded from the portion $P_9$ of the surface 9 of the sample. The image $I_9^l$ is analyzed in order to identify the feature $F_4$ within the image. Naturally, the position of the feature $F_4$ does not exactly coincide with its estimated position 43.

For this purpose, the imaged surface portion $P_9$ is displaced to a new position $\vec{j}_9^s$.

The position of the feature $F_4$ in the image $I_9^l$ is $\vec{f}_9^{4l}$, accordingly. The position $\vec{r}_{14}^{s}$ of feature $F_4$ relative to feature $F_1$ can be calculated according to the following formula:

$$\vec{r}_{14}^{s} = -\vec{f}_5^{1l} - \vec{j}_5^s + \vec{j}_9^s + \vec{f}_9^{4l} \qquad (1)$$

It is apparent that the accuracy with which the position between the features $F_1$ and $F_4$ can be determined is limited by the accuracy with which the position of the stage relative to the microscope 2 can be measured. This accuracy is determined by the measuring system 33, which is typically lower than the low imaging resolution used for imaging a surface portion as large as the field of view of the microscope.

Figure 3:
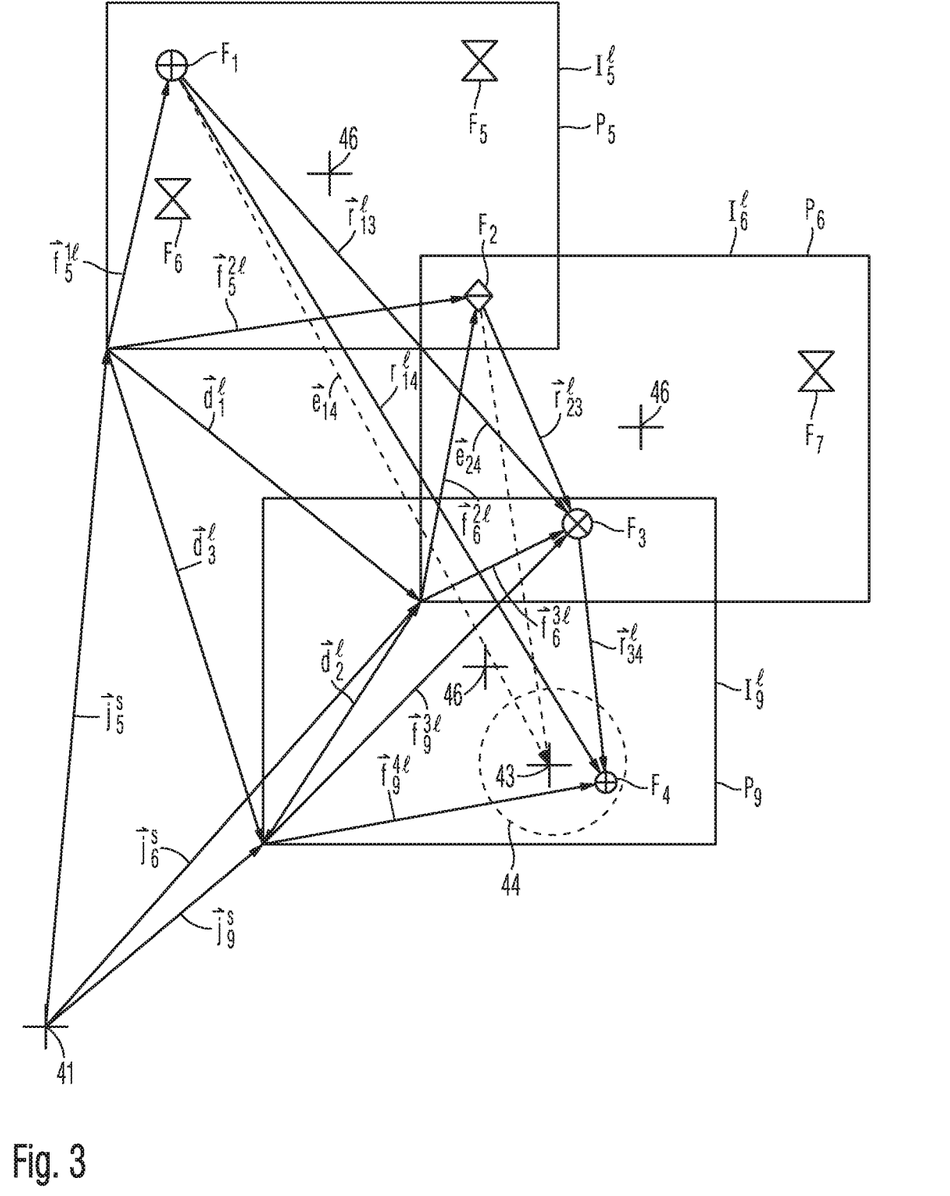
FIG. 3 illustrates a method of determining the relative position between two sample features with an accuracy corresponding to a low imaging resolution.

FIG. 3 is a schematic diagram illustrating a method for determining the relative position of features $F_1$ and $F_4$ in FIG. 2 with a higher accuracy. It is assumed that the image $I_5^l$ has been recorded and that the position $\vec{f}_5^{1l}$ of feature $F_1$ has been determined, and that an estimated position $\vec{e}$ of feature $F_4$ is known.

The image $I_5^l$ is further analyzed to identify additional features arranged at a distance from the first feature $F_1$ within the image. In the illustrated example, candidate features $F_2$, $F_s$ and $F_6$ are identified in the image. One of these candidate features located closest to the estimated position 43 of target feature $F_4$ is selected as the second feature $F_2$ for the next steps of the method. $\vec{f}_5^{2l}$ is the position of feature $F_2$ within the image $I_5^l$. The sample is then displaced such that the field of view is closer to the estimated position 43 of the target feature $F_4$ while the second feature $F_2$ is still contained within the field of view. In the illustrated example, a portion $P_6$ of the sample located at $\vec{j}_6^s$ is imaged at the low imaging resolution as image $I_6^l$. The second image feature $F_2$ is identified within the image by image processing, and its position within the image $I_6^l$ is determined as $\vec{f}_6^{2l}$. The displacement of the stage between images $I_5^l$ and $I_6^l$ can be calculated as:

$$\vec{d}_1^l = +\vec{f}_5^{2l} - \vec{f}_6^{2l} \qquad (2)$$

This means that the displacement of the stage between two images can be determined with an accuracy corresponding to the low imaging accuracy "l" which is higher than the positioning accuracy "s" of the stage since the positions $\vec{j}_5^s$ and $\vec{j}_6^s$ do not appear in the above formula (2).

Thereafter, further candidate features are identified in the image $I_6^l$. In the illustrated example, the further candidate features are $F_3$ and $F_7$. As feature $F_3$ is located closer to the estimated position 43 of the target feature than feature $F_7$, feature $F_3$ is selected as the next feature for performing the method. The stage is translated such that the field of view is closer to the estimated position 43 of the target feature $F_4$ while feature $F_3$ is still contained within the field of view. In the illustrated example, the stage is displaced such that object portion $P_9$ located at $\vec{j}_9^s$ in the coordinate system 41 of the sample coincides with the field of view of the microscope, and an image $I_9^l$ is recorded. The image $I_9^l$ is analyzed to identify the third feature $F_3$ and to determine its position $\vec{f}_9^{3l}$ within this image. Since feature $F_3$ is contained in both images $I_6^l$ and $I_9^l$, the displacement $\vec{d}_2^l$ of the stage between images $I_6^l$ and $I_9^l$ is as follows:

$$\vec{d}_2^l = +\vec{f}_6^{3l} - \vec{f}_9^{3l} \qquad (3)$$

Image $I_9^l$ is further analyzed to determine whether the target feature $F_4$ is contained within the image and located sufficiently close to the estimated position 43, i.e. within the circle 44. Since this is the case in the example illustrated with reference to FIG. 3, the position $\vec{f}_9^{4l}$ of feature $F_4$ within the image $I_9^l$ is determined.

If the target feature $F_4$ were not contained in the image $I_9^l$, further cycles of displacements of the stage and recordings of the low resolution images would be repeated until the target feature comes into the field of view.

The relative position between features $F_1$ and $F_4$ can be calculated according to the following formula:

$$\vec{r}_{14}^l = -\vec{f}_5^{1l} + \vec{d}_1^l + \vec{d}_2^l + \vec{f}_9^{4l} \qquad (4)$$

It is apparent that the accuracy of the determination of the relative position $\vec{r}_{14}^l$ corresponds to the low imaging resolution "l" of the images and can be significantly better than the accuracy of the positioning of the stage. This is possible since there exists a contiguous path between features $F_1$ and $F_4$, extending from $F_1$ to $F_2$, from $F_2$ to $F_3$ and from $F_3$ to $F_4$ along which images with the low imaging resolution are recorded, and wherein at least one discernible image feature is located in each overlapping portion between adjacent images.

It is possible to further increase the accuracy of this method of position measurement by increasing the imaging resolution. When the imaging resolution is increased by a factor of 2, the area of the imaged portion of the surface of the sample is reduced by a factor of 4 when the number of pixels is maintained constant. This means that a measurement time required for performing the method illustrated with reference to FIG. 3 increases rapidly when the measurement accuracy is increased. Moreover, the number of terms in the above formula (4) increases with the number of images, such that more and more measurement errors accumulate and eventually prevent a further increase in the measurement accuracy.

When the imaged portions of the sample becomes smaller, a higher number of image portions is involved to cover a contiguous path between the initial feature $F_1$ and the target feature $F_4$ with overlapping images.

Figure 4:
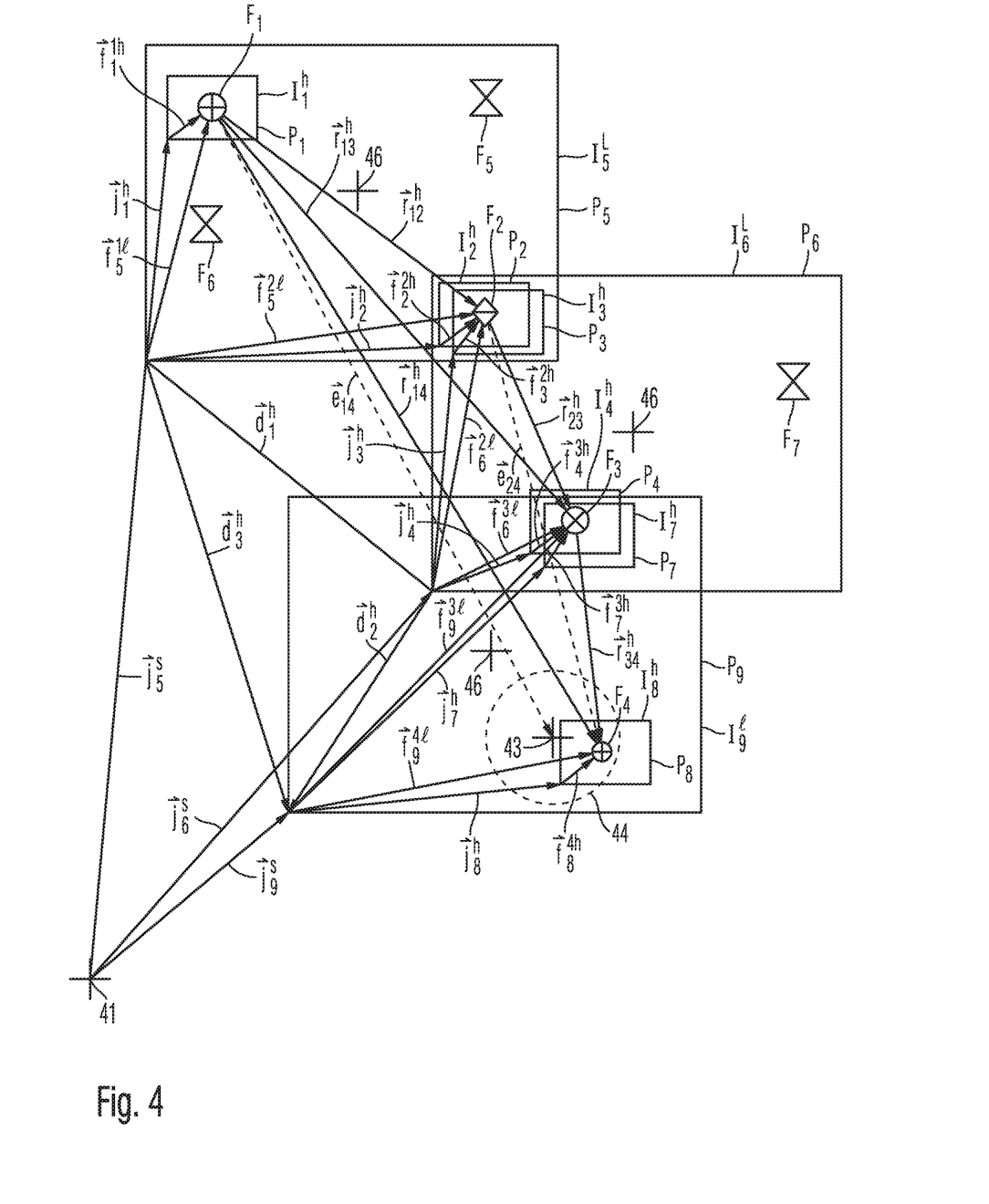
FIG. 4 illustrates a method of determining the relative position between two sample features with an accuracy corresponding to a high imaging resolution.

FIG. 4 is a schematic illustration of a further method of operating a microscope which allows to achieve an even higher measurement accuracy than the method illustrated with reference to FIG. 3. It is again assumed that the relative position between features $F_1$ and $F_4$ should be measured. Based on prior knowledge on the position of the feature $F_1$, a high resolution image $I_1^h$ of a portion $P_1$ of the surface of the sample is recorded. The portion $P_1$ has been selected such that it can be expected that it contains the feature $F_1$ based on its estimated position. If the prior knowledge on the position of feature $F_1$ is insufficient, the low resolution image Is can be recorded as illustrated with reference to FIG. 3 above in order to determine the position $\vec{f}_5^{1l}$ within this image such that the portion $P_1$ of the surface can be selected to contain the feature $F_1$.

The position of the portion $P_1$ of the surface and of the image $I_1^h$ within the field of view can be represented by a vector $\vec{j}_1^h$ pointing from the lower left corner of the field of view to the lower left corner of the high resolution image, and the position of the feature $F_1$ within the high resolution image $I_1^h$ can be indicated by a vector $\vec{f}_1^{1h}$.

Thereafter, a high resolution image $I_2^h$ of a surface portion $P_2$ is recorded, wherein the surface portion $P_2$ has been selected such that it contains the second image feature $F_2$. The selection of the portion $P_2$ can be based on prior knowledge on the location of feature $F_2$, wherein such prior knowledge can be based on a previously recorded image, such as image $I_5^l$. The relative position $\vec{r}_{12}^h$ between features $F_1$ and $F_2$ can be calculated by the following formula:

$$\vec{r}_{12}^h = -\vec{f}_1^{1h} - \vec{j}_1^h + \vec{j}_2^h + \vec{f}_2^{2h} \qquad (5)$$

Thereafter, the sample is displaced relative to the microscope such that the field of view comes closer to the target position 43 as illustrated with reference to portion $P_6$ of the surface in FIG. 3 above. Thereafter, a high resolution image $I_3^h$ of a portion $P_3$ of the sample is recorded. The portion $P_3$ is selected such that it is expected to contain the feature $F_2$. Due to the inaccuracy of the displacement of the stage, surface portions $P_2$ and $P_3$ will typically not coincide.

The position $\vec{j}_3^h$ of the high resolution image $I_3^h$ within the field of view and the position $\vec{f}_3^{2h}$ of feature $F_2$ within the high resolution image $I_3^h$ is obtained based on an image analysis of the high resolution image $I_3^h$. Since the same feature $F_2$ is contained in the high resolution images $I_2^h$ and $I_3^h$ recorded before and after the displacement of the stage, the displacement of the stage can be calculated according to the following formula:

$$\vec{d}_1^h = +\vec{j}_2^h + \vec{f}_2^{2h} - \vec{f}_3^{2h} - \vec{j}_3^h \qquad (6)$$

It is apparent that the displacement of the stage can now be determined with an accuracy corresponding to the high imaging resolution.

Thereafter, a further feature located within the field of view simultaneously with feature $F_2$ and closer to the target position 43 is selected based on prior knowledge which, if not available, can be obtained by recording a low resolution image of a larger portion of the object, such as portion $P_6$ illustrated with reference to FIG. 3 above. In the illustrated example, feature $F_3$ is selected. A high resolution image $I_n^4$ is recorded before a further displacement of the stage, and a further high resolution image $I_7^h$ is recorded subsequent to such further displacement of the stage. The further displacement of the stage is determined as illustrated above with reference to the displacement $\vec{d}_1^h$ or illustrated with reference to portion $P_9$ in FIG. 3 above. Since, in the illustrated example, the target feature $F_4$ is already contained in the field of view $P_9$, no further displacements of the sample relative to the microscope are necessary. A high resolution image $I_8^h$ of a portion $P_8$ of the surface containing the target feature $F_4$ is recorded. Now, the position of the target feature $F_4$ relative to the feature $F_1$ can be determined according to the following formula:

$$\vec{r}_{14}^h = -\vec{f}_1^{1h} - \vec{j}_1^h + \vec{d}_1^h + \vec{d}_2^h + \vec{j}_6^h + \vec{f}_6^{4h} \qquad (7)$$

It appears that it is possible with the illustrated method to determine the relative position of two features ($F_1$, $F_4$) which are not contained within a single field of view of the microscope with an accuracy corresponding to the high imaging resolution of the microscope, since the above formula does not contain any terms having an accuracy limited by the low imaging resolution or the accuracy of the stage. This is possible by using pairs of image features corresponding to sample features which are contained within each single field of view of the microscope as "stepping stones" between displacements of the sample relative to the microscope. It is then not necessary to provide a contiguous path of overlapping high resolution images between the initial feature and the target feature such that a relatively low number of images needs to be recorded. If the sample provides a sufficient number of candidate features along a path between the initial feature and the target feature, the number of high resolution images which is desired is determined by the field of view of the microscope and is independent of the imaging resolution of the high resolution images. Therefore, the accuracy can be increased proportional to the imaging resolution without increasing the number of terms in formula (7) above.

If features forming the above-mentioned "stepping stones" cannot be found or identified within a field of view of the microscope, it is possible to generate such features by methods such as scratching with a needle or depositing material on the sample or removing material from the sample using a charged particle beam, such as an ion beam or an electron beam. This charged particle beam can be generated by the microscope itself or a beam generator, such as a focused ion beam source separate from the microscope. A processing gas can be supplied to the location of incidence of the particle beam for enhancing the deposition of material on the sample or the removal of material from the surface of the sample.

The relative positions between each pair of the features $F_1$, $F_2$, $F_3$ and $F_4$ have been measured with the high accuracy in the exemplary procedure illustrated above. At the end of this procedure, the stage is positioned relative to the microscope such that feature $F_4$ is located within the field of view of the microscope. If it is now assumed that the procedure should be continued by determining the relative positions between features $F_4$ and $F_5$ which are not in the same field of view, this task can be facilitated by reusing the already determined positions of the features $F_3$ and $F_2$. It is then possible to immediately displace the stage relative to the microscope such that features $F_1$ and $F_5$ are simultaneously arranged in the field of view of the microscope, without acquiring low and high resolution images along the contiguous path between features $F_4$ and $F_5$.

While the disclosure has been described with respect to certain exemplary embodiments thereof, it is evident that many alternatives, modifications and variations will be apparent to those skilled in the art. Accordingly, the exemplary embodiments of the disclosure set forth herein are intended to be illustrative and not limiting in any way. Various changes may be made without departing from the spirit and scope of the present disclosure as defined in the following claims.

What is claimed is:

1. A method of operating a microscope, the method comprising:
    displacing a sample relative to the microscope by a first displacement;
    recording a first image of a first portion of the sample at a first imaging resolution, using the microscope, prior to the performing of the first displacement, wherein the first image contains a first image feature corresponding to a first sample feature contained in the first portion of the sample;
    recording a second image of a second portion of the sample at a second imaging resolution, using the microscope, prior to the performing of the first displacement, wherein the second image contains a second image feature corresponding to a second sample feature contained in the second portion of the sample, and wherein the second sample feature is arranged at a distance from the first sample feature;
    recording a third image of a third portion of the sample at a third imaging resolution, using the microscope, subsequent to the performing of the first displacement, wherein the third image contains the second image feature corresponding to the second sample feature;
    recording a fourth image of a fourth portion of the sample at a fourth imaging resolution, using the microscope, subsequent to the performing of the first displacement, wherein the fourth image contains a third image feature corresponding to a third sample feature contained in the fourth portion of the sample, and wherein the third sample feature is arranged at a distance from the second sample feature;
    recording a fifth image of a fifth portion of the sample at a fifth imaging resolution, using the microscope, prior to the first displacement;
    recording a sixth image of a sixth portion of the sample at a sixth imaging resolution, using the microscope, subsequent to the performing of the first displacement; and
    determining a position of the third sample feature relative to the first sample feature based on the first, second, third, fourth, fifth and sixth images,
    wherein:
        the first and second portions of the sample at least partially overlap with the fifth portion of the sample;
        the second and third portions of the sample at least partially overlap with the sixth portion of the sample;
        the first and second image features are both contained in the fifth image;
        the second and third image features are both contained in the sixth image;
        the third image feature is not contained in the fifth image;
        the first image feature is not contained in the sixth image;

the fifth imaging resolution is lower than each of the first, second, third and fourth imaging resolutions; and the sixth imaging resolution is lower than each of the first, second, third and fourth imaging resolutions.

2. The method according to claim 1, further comprising determining the first displacement based on at least one of an estimated position of the third sample feature relative to at least one of the first sample feature and the second sample feature, and on an estimated position of a target sample feature relative to at least one of the first sample feature and the second sample feature.

3. The method according to claim 1, further comprising analyzing the fifth image and identifying one or more image feature candidates within the fifth image and selecting one of the one or more image feature candidates as the second image feature.

4. The method according to claim 3, wherein the selecting is based on an estimated position of a target sample feature relative to at least one of the first sample feature and a one or more sample feature corresponding to the one or more image feature candidates.

5. The method according to claim 1, further comprising analyzing the sixth image and identifying one or more image feature candidates within the sixth image and selecting one of the one or more image feature candidates as the third image feature.

6. The method according to claim 5, wherein the selecting is based on an estimated position of a target sample feature relative to the second sample feature.

7. The method according to claim 1, wherein the determining of the position of the third sample feature relative to the first sample feature comprises:
determining a first position of the first image feature within the first image,
determining a second position of the second image feature within the second image,
determining a third position of the second image feature within the third image, and
determining a fourth position of the third image feature within the fourth image.

8. The method according to claim 1, wherein the microscope has a predetermined field of view, wherein:
recording the first image includes recording of a fifth position of the first image within the field of view;
recording the second image includes recording of a sixth position of the second image within the field of view;
recording the third image includes recording of a seventh position of the third image within the field of view; and
recording the fourth image includes recording of an eighth position of the fourth image within the field of view.

9. The method according to claim 1, wherein the microscope has a predetermined field of view, wherein:
recording the first image includes recording of a fifth position of the first image within the field of view;
recording the second image includes recording of a sixth position of the second image within the field of view;
recording the third image includes recording of a seventh position of the third image within the field of view; and
recording the fourth image includes recording of an eighth position of the fourth image within the field of view; and
the method further comprises:
determining a first position of the first image feature within the first image;
determining a second position of the second image feature within the second image;
determining a third position of the second image feature within the third image; and
determining a fourth position of the third image feature within the fourth image; and
determining the position of the third sample feature relative to the first sample feature is based on the first position, the second position, the third position, the fourth position, the fifth position, the sixth position, the seventh position, and the eighth position.

10. The method according to claim 1, wherein, subsequent to the recording of the third and fourth images, there exist regions of the sample along a straight line extending from the first sample feature to the third sample feature which have not been recorded as an image at a fifth imaging resolution, wherein the fifth imaging resolution is higher than or equal to the lowest imaging resolution among the first, second, third and fourth imaging resolutions.

11. The method according to claim 1, further comprising generating at least one of the second and third sample features.

12. The method according to claim 11, wherein the generating of the at least one of the second and third sample features is performed subsequent to the recording of the first image.

13. The method according to claim 11, wherein the generating of the at least one of the second and third sample features is performed using a charged particle beam.

14. The method according to claim 3, further comprising determining the first displacement based on at least one of an estimated position of the third sample feature relative to at least one of the first sample feature and the second sample feature, and on an estimated position of a target sample feature relative to at least one of the first sample feature and the second sample feature.

15. The method according to claim 5, further comprising determining the first displacement based on at least one of an estimated position of the third sample feature relative to at least one of the first sample feature and the second sample feature, and on an estimated position of a target sample feature relative to at least one of the first sample feature and the second sample feature.

16. The method according to claim 7, further comprising determining the first displacement based on at least one of an estimated position of the third sample feature relative to at least one of the first sample feature and the second sample feature, and on an estimated position of a target sample feature relative to at least one of the first sample feature and the second sample feature.

17. The method according to claim 8, further comprising determining the first displacement based on at least one of an estimated position of the third sample feature relative to at least one of the first sample feature and the second sample feature, and on an estimated position of a target sample feature relative to at least one of the first sample feature and the second sample feature.

18. The method according to claim 9, further comprising determining the first displacement based on at least one of an estimated position of the third sample feature relative to at least one of the first sample feature and the second sample feature, and on an estimated position of a target sample feature relative to at least one of the first sample feature and the second sample feature.

19. The method according to claim 10, further comprising determining the first displacement based on at least one of an estimated position of the third sample feature relative to at least one of the first sample feature and the second sample feature, and on an estimated position of a target sample feature relative to at least one of the first sample feature and the second sample feature.

20. The method according to claim 11, further comprising determining the first displacement based on at least one of an estimated position of the third sample feature relative to at least one of the first sample feature and the second sample feature, and on an estimated position of a target sample feature relative to at least one of the first sample feature and the second sample feature.

* * * * *

UNITED STATES PATENT AND TRADEMARK OFFICE
CERTIFICATE OF CORRECTION

PATENT NO. : 10,838,191 B2
APPLICATION NO. : 15/843441
DATED : November 17, 2020
INVENTOR(S) : Susan Candell, Thomas Anthony Case and Lorenz Lechner Page 1 of 1

It is certified that error appears in the above-identified patent and that said Letters Patent is hereby corrected as shown below:

On the Title Page

Column 2 (Abstract), Line 6, delete "$\vec{d}$;" and insert -- $\vec{d}_1$ --;

In the Specification

Column 6, Line 63, delete "catholuminescent" and insert -- cathodoluminescent --;

Column 8, Line 29, delete "$\vec{e}$" and insert -- $\vec{e}_{14}$ --;

Column 8, Lines 59-62, delete "It is assumed that the image $I_5^l$ has been recorded and that the position $\vec{f}_5^{1l}$ of feature $F_1$ has been determined, and that an estimated position $\vec{e}$ of feature $F_4$ is known," and insert the same on Column 8, Line 60 as a new paragraph.

Column 8, Line 61, delete "$\vec{e}$" and insert -- $\vec{e}_{14}$ --;

Column 8, Line 66, delete "F$_s$" and insert -- F$_5$ --;

Column 10, Line 23, delete "Is" and insert -- $I_5^l$ --.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*